April 17, 1951 G. A. MATTHEWS 2,549,497
PROTECTIVE DEVICE FOR ELECTRICAL POWER
TRANSMISSION SYSTEMS
Filed July 16, 1948 4 Sheets-Sheet 1
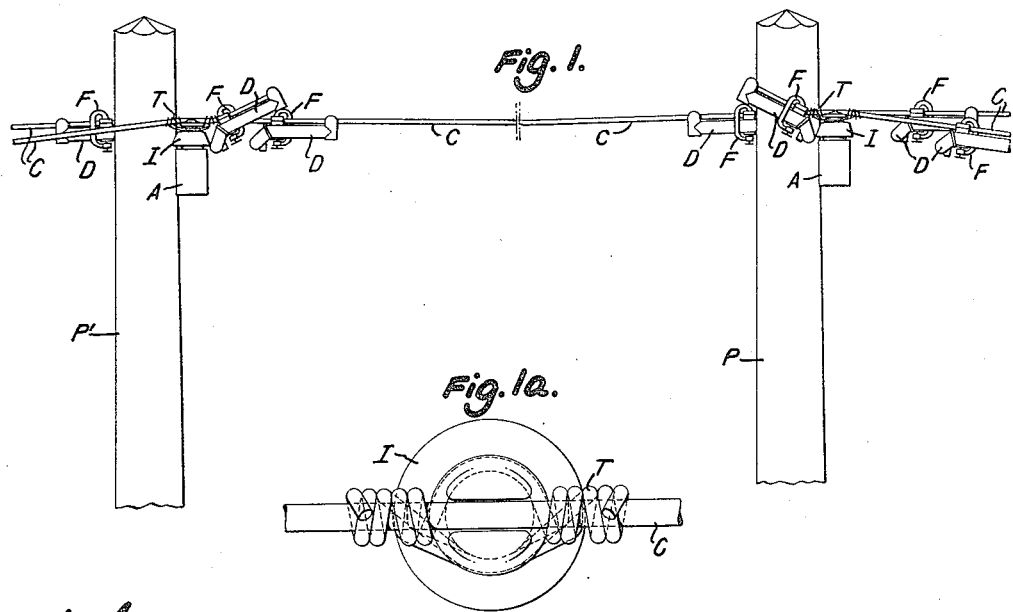
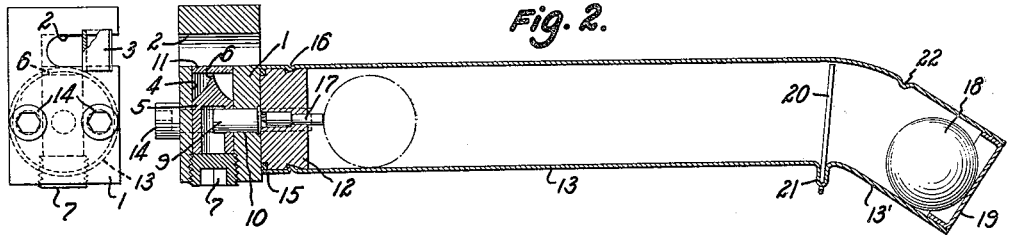
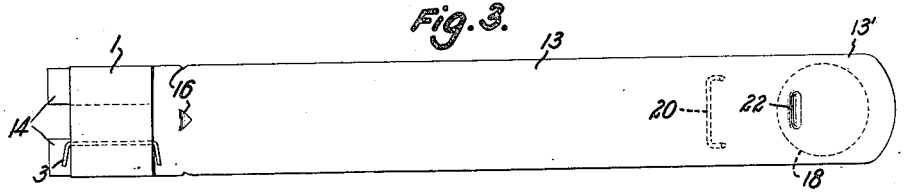
Inventor:
George A. Matthews,
By Pierce, Scheffler & Parker,
Attorneys.

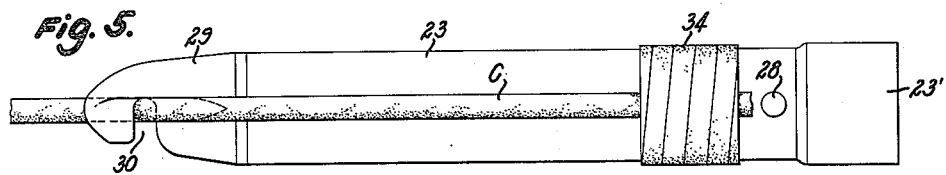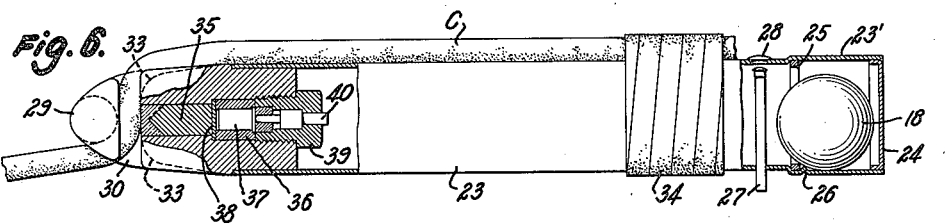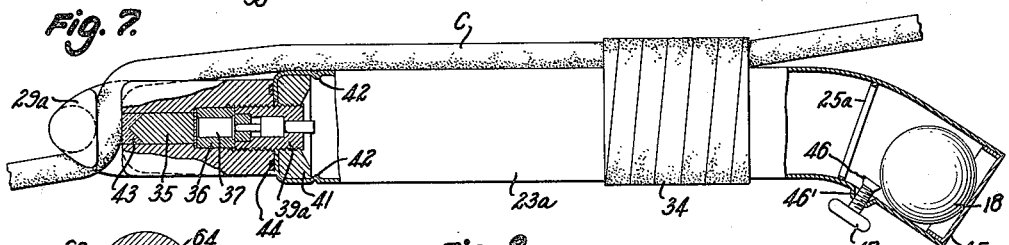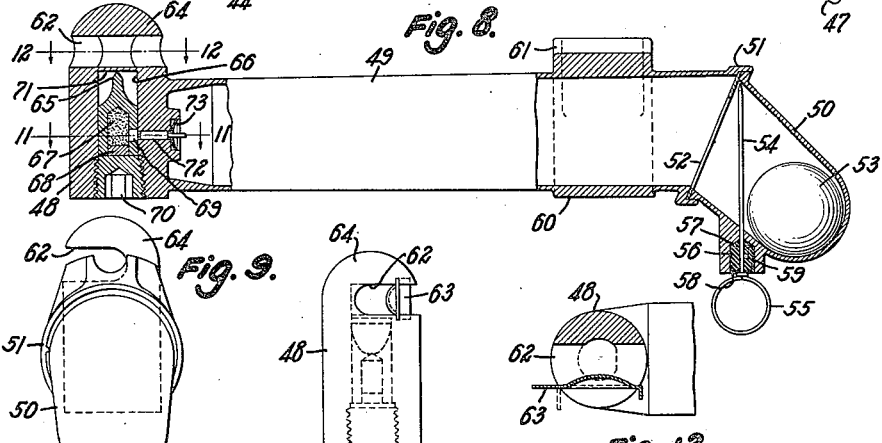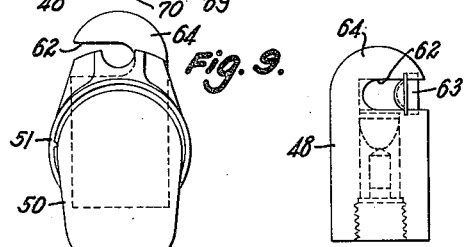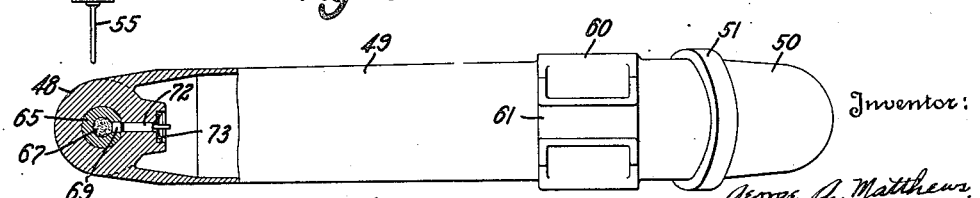

April 17, 1951  G. A. MATTHEWS  2,549,497
PROTECTIVE DEVICE FOR ELECTRICAL POWER
TRANSMISSION SYSTEMS
Filed July 16, 1948  4 Sheets-Sheet 3
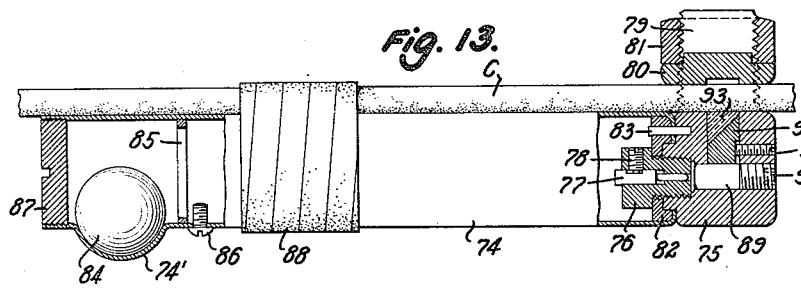
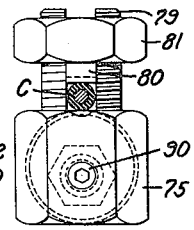
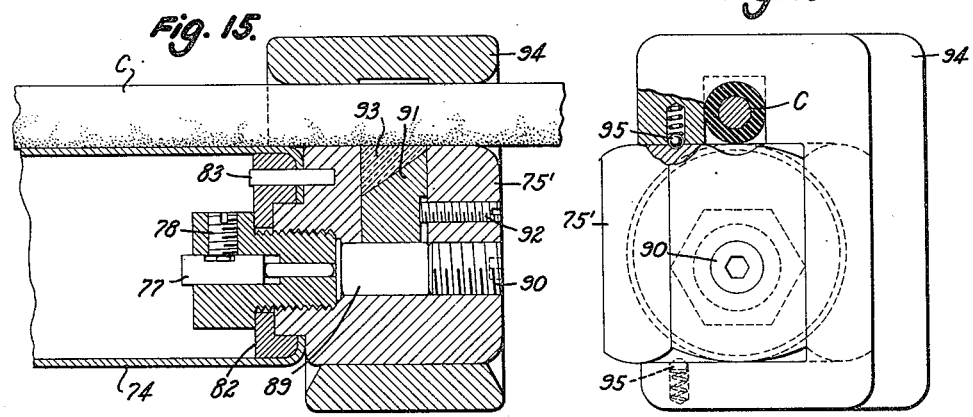
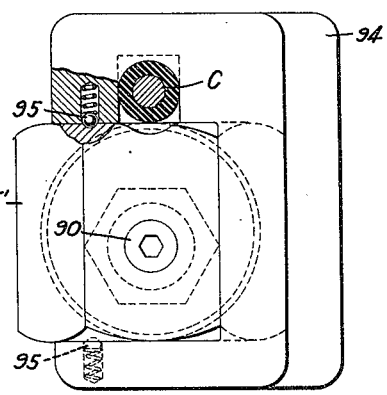
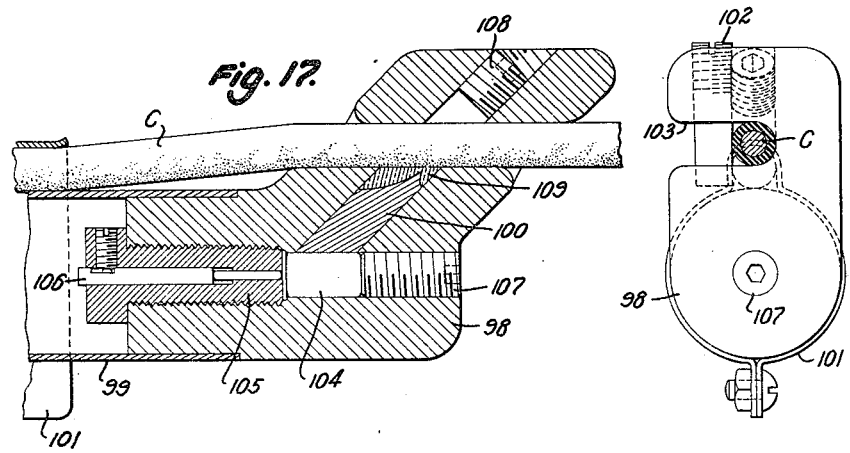
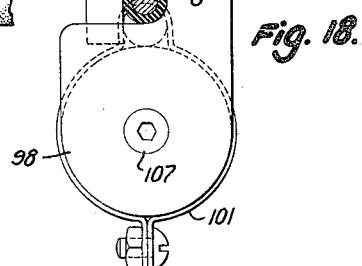
Inventor:
George A. Matthews,
By Pierce, Scheffler & Parker,
Attorneys.

UNITED STATES PATENT OFFICE 2,549,497

PROTECTIVE DEVICE FOR ELECTRICAL POWER TRANSMISSION SYSTEMS

George A. Matthews, Detroit, Mich.

Application July 16, 1948, Serial No. 39,153

16 Claims. (Cl. 200—79)

The invention relates to protective devices for overhead electrical power lines and more particularly to protective devices for mechanically and electrically disconnecting a parted overhead conductor so that a ground fault from this cause can not be imposed upon the system.

Electrical power lines of the overhead type are subject to damage from arc-over arising from lightning and the falling of tree branches during storms, and from various other accidental and unpredictable causes against which it is impossible or impractical to provide adequate protection. As explained in my prior Reissue Patents Nos. 22,872 and 22,873, and Patent No. 2,339,025, the protective apparatus of an overhead power line may operate so rapidly as to prevent a burn-off of the conductors in the event of a lightning flash-over or other transient fault, but it is neither possible nor practical to avoid burn-off or parting of an overhead conductor in the event of a more permanent fault which may be due, for example, to a heavy tree branch falling upon the conductors during a rain storm. One or both ends of a parted conductor fall to the ground, thereby resulting in a ground fault if the conductor parts before the protective switchgear has completed its cyclic operation to a lockout, or if voltage is again imposed upon the line before the grounded conductor is located and removed.

Electrical service on the entire distribution system is usually interrupted when a parted conductor creates a ground fault on a distribution circuit having one power source, and also on a so-called "loop" distribution circuit having power sources at each end of the loop circuit when one or both ends of the parted conductor establish ground faults. In addition to this immediate consequence of ground faults from fallen wires, there is an extreme hazard to life and property when the fallen wire lies on or near ground level, or in a position to invite handling by unskilled persons.

Depending on the position and location of the fallen conductors, the conductors may still be energized by high voltage, a condition which is often responsible for serious injury to persons and for damage to property resulting from fires ignited by the energized conductor contacting objects or material having ground potential. An energized conductor may also contact other innocent looking objects, such as fences, making them serious hazards to life and property due to the high voltage impressed on them by the contacting energized conductor.

Some electrical systems are operated in the grounded neutral Y connection, while others are operated in the ungrounded delta connection. Most generally the grounded Y system is so set up by relay protection or by other devices to de-energize a line when electrical contact to ground is made by one or more of the conductors. However, a "down" conductor may be hanging in the clear of ground but easily accessible to persons and/or cattle. Or, the contact with ground is of a nature which has sufficient electrical resistance to prevent a current to flow to ground in magnitude great enough to cause operation of the protective devices to de-energize the conductors.

In other instances, the circuit arrangement is such that the fallen wire is fully energized and therefore a source of danger to life and property.

As a general rule, overhead conductors, especially on a distribution system, are located along a thoroughfare because the loads on such circuits are also located adjacent thoroughfares. Because of this location, a hanging overhead wire in most cases interferes with the free flow of traffic on the thoroughfare. The invention will permit immediate and safe removal of an overhead wire which has fallen, so that normal use of the adjacent thoroughfare is quickly restored.

General objects of the present invention are to improve the continuity of electrical service on distribution lines in the event that a conductor parts or breaks for any reason, and to eliminate the mechanical and electrical hazards arising from the trailing upon or near ground of one or both ends of the parted conductor. Objects are to eliminate the disadvantages and hazards arising from the parting of an overhead conductor between adjacent insulator supports by mechanically or electrically severing the parted conductor ends adjacent the respective insulator supports. Objects of the invention are to provide devices or apparatus operable upon the dropping of the parted ends of an overhead conductor to sever the respective ends adjacent their normal supported points. More specifically, an object is to provide a conductor-severing device for mounting upon an overhead conductor adjacent its supported end; the device including a tube containing an explosive cartridge, a ball movable in the tube upon a tilting of the conductor into abnormal position to fire the cartridge, and a line-parting element energized by the firing of the cartridge to sever the conductor, the line-parting element being a cutter blade or, alternatively, a heat-generating capsule for melting the conductor.

These and other objects and the advantages of the invention will be apparent from the following specification when taken with the accompanying drawings in which:

Fig. 1 is a schematic side elevation of spans of a two-wire overhead distribution line provided with protective devices embodying the invention;

Fig. 1a is a plan view on a larger scale of a conductor, tie wire and insulator;

Fig. 2 is a vertical central section through a protective device specifically different from the one shown schematically in Fig. 1;

Figs. 3 and 4 are, respectively, a plan view and an end view of the protective device of Fig. 2;

Fig. 5 is a plan view of another embodiment of the invention;

Fig. 6 is a vertical section through the same;

Fig. 7 is a central vertical section through another embodiment of the invention;

Fig. 8 is a central vertical section through the embodiment of the invention which is shown schematically in Fig. 1;

Figs. 9 and 10 are opposite end views of the device of Fig. 8;

Fig. 11 is a plan view of the same with parts shown in horizontal section;

Fig. 12 is a fragmentary section taken on line 12—12 of Fig. 8;

Figs. 13 and 14 are a central vertical section and an end elevation, respectively, of another embodiment;

Figs. 15 and 16 are respectively a central section and an end elevation of a modified construction;

Figs. 17 and 18 are respectively a central vertical section through and an end elevation of a protective device for severing a parted overhead conductor by cutting the same at an angle to the axis of the conductor;

Figure 19:
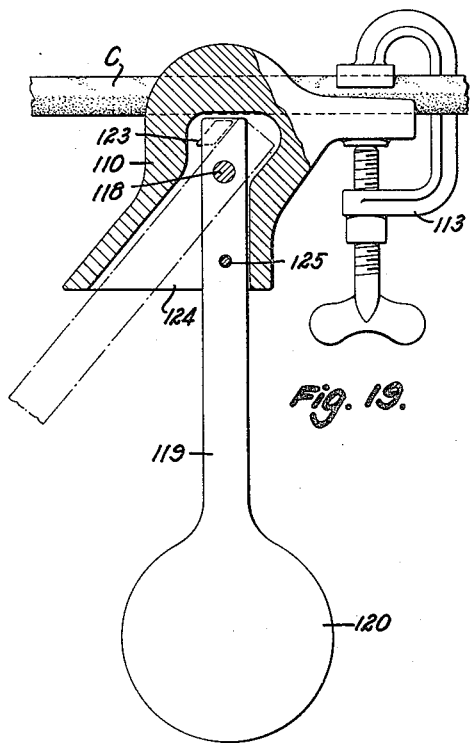
Fig. 19 is a side elevation, partly in section, of an embodiment in which a weighted arm or pendulum controls the firing of a cartridge to sever a parted conductor.

In Fig. 1 of the drawings, the reference characters P, P' identify poles carrying crossarms A upon which insulators I are mounted to support the conductors C of an overhead power transmission line. In accordance with the invention, gravity-actuated protective devices D are mounted on the conductors C adjacent the crossarms A to sever the ends of a span of conductor C in the event that it is parted between the crossarms A by an electrical fault or mechanical breakage. Each protective device is secured to its conductor C by appropriate fastenings F, for example by a C-clamp or a winding of adhesive tape, to prevent the device from falling to the ground after its operation to sever a parted conductor. As shown schematically in Fig. 1, the "near" conductor of the spans to the left of pole P has been severed by its protective devices D, and the devices are retained upon the stub end of the conductor by the fastenings F. The conductors C are anchored to the insulators I by the tie-wires T which permit the slipping of a parted conductor end on the insulator by the tension on the adjacent span until the anchored device D strikes the insulator I or the tie-wire T to prevent the escape of the severed conductor end from the insulator. If the severed end should slide free of the insulator, the result would be the progressive dropping and severing of other spans of the conductor.

As shown in Figs. 2 to 4 inclusive, the device D comprises a rectangular block 1 of steel having a jaw or laterally opening slot 2 for receiving a conductor C, and a removable keeper clip 3 which is slidable in longitudinal grooves cut in the opposite walls of the slot to secure the block upon the conductor. The block 1 has a bore 4 extending upward from the bottom to intersect the slot 2, and a cutting piston 5 with a knife edge 6 transverse to the axis of slot 2 is slidable in the bore 4 and retained therein by a threaded plug 7. The piston is hollow and has a lateral opening for receiving the end of a blank center-fire revolver shell 9 seated in a bore or chamber 10 at the inner face of the block 1. A waterproof seal, for example a waxed wad 11 is provided at the upper end of the bore 4 to exclude dirt and moisture.

The cutting piston 5 and shell 9 are mounted in the block 1, and the assembly is secured to a plug or end closure 12 of a tube 13 by bolts 14, a sealing ring gasket or washer 15 being provided at the end of the tube closure 12. The closure 12 is secured to the tube, for example by indenting portions 16 of the tube wall into notches in the cylindrical surface of the closure 12. A firing pin 17 is slidably mounted in an axial passage through the closure 12, and the "hammer" for actuating the firing pin is a heavy ball 18, of iron or of ceramic or plastic material which is normally retained in the inner down-turned end 13' of the tube 13. The term "inner" has reference to the device D with respect to the supported end of the conductor C, i. e. the inner end is the end adjacent the crossarm A and insulator I. The inner end of tube 13 is closed by a cap 19 which is pressed into the tube section 13'.

A safety device comprising a wire 20 of U-shape has the ends thereof projected into the tube 13 through a fold or crease 21 in the lower portion of the tube, the legs of the safety wire having a tight sliding fit in the fold 21. The safety wire prevents the inadvertent firing of the blank shell during transportation of the device D and its installation on a conductor.

The inner diameter of the tube 13 is appreciably larger than the diameter of the ball 18 to permit an undamped free fall of the ball 18 when the axis of the tube drops into approximately vertical position upon the parting of the conductor C, but a metering device is essential to prevent movement of the ball along the tube during the interval between the parting of the conductor and the moment when the supported end of the conductor assumes a position substantially below its normal horizontal position, such position being approximately a forty-five degree inclination. The sudden release of the stringing tension when a conductor is parted in the span section results in a whipping of the conductor ends which may forcibly move the device D back-and-forth, and slightly up-and-down several times before it actually tips downward for a free roll of the ball to firing position. This shock vibration tends to throw the ball upwardly out of its pocket 13' and into the straight portion of tube 13 before the device tips downwardly, thereby reducing the travel of the ball to the firing pin after the device does tilt when the conductor falls. This undesirable condition is avoided by reducing the effective diameter of the mouth of the pocket 13', for example by the illustrated indentation 22, to but slightly more than the diameter of the ball 18. This prevents the ball from entering tube 13 by upward movement of the ball due to vibration of the device but does not interfere with the free entrance of the ball into tube 13 upon tilting of the device. The metering indentation 22 also retains the ball 18 in its pocket 13' during movement of the device D caused by the "dancing" of the conductor to which it is attached.

The wire-dropping device D is readily installed upon a conductor C by slipping the jaw 2 over the conductor, inserting the keeper 3 in slot 2 of the block 1 and bending the keeper end over to retain it in place; and then winding tape about the conductor and the inner end of tube 13. A tie T is applied to secure the conductor C to the insulator I, if not already in place, to prevent separation of conductor C from the insulator while permitting the severed conductor end to slip through the tie-wire and insulator until the wire-dropping device contacts the insulator or tie-wire. This slipping-through of the conductor is beneficial because it reduces appreciably the tension in the intact span, thereby minimizing the out-of-balance strain on the crossarm. For instance, for a 100 foot span of No. 1 copper conductor (bare-stranded), the normal tension in the wire is 1100 pounds, with a corresponding sag of 0.29 foot. If the length of the conductor in this span is increased by six inches (caused by the wire slipping through the tie at the insulator after severance by the wire-dropper) the tension is reduced to 75 pounds with a corresponding sag of 4.3 feet. Other initial spacings of the wire-dropping device from the insulator may of course be employed but the presently preferred spacing is about six inches.

Another embodiment of the invention, as illustrated in Figs. 5 and 6, comprises a housing or straight tube 23 with an inner end 23' of slightly enlarged diameter in which a ball 18 is normally retained, the end of the section 23' being closed by a press-fitted cap 24. A metering ring 25 with an internal diameter but slightly in excess of the diameter of the ball 18 is anchored at the exit end of the ball pocket 23' by indentations 26. A headed safety pin 27 is inserted transversely of the tube 23 through a hole which is subsequently sealed by a closure 28, and the pin has a tight sliding fit in an opening in the wall of the tube 23. A cutting head 29 is press-fitted into the outer end of the tube 23 and has a vertically arranged transverse slot 30, see Fig. 5, for receiving the conductor C, and horizontally arranged grooves 33 leading into the transverse slot 30 at opposite sides of the cutting head 29 to receive the conductor C and secure the wire-dropping device thereon when the inner end of the tube is secured to the conductor by a tape winding 34. The cutting head 29 has an axial bore in which a cutting piston 35 is located, the inner end of the cutting head being counterbored to provide a seat for a bushing or chamber 36 for a blank cartridge 37. The cartridge chamber is seated against a sealing disk 38 by a bushing 39 which is threaded into the inner end of the cutting head 29 and forms a housing for the firing pin 40.

Another embodiment, as illustrated in Fig. 7 includes a cutting head 29a which is similar to the cutting head 29 of Figs. 5 and 6 but is secured against the inturned end of a tubular housing 23a by a firing pin bushing 39a threaded into the cutting head 29a and into an annular member 41 secured in the outer end of the housing 23a by indentation 42. A cutting piston 35, cartridge chamber 36 and cartridge 37 similar to those previously described are arranged in the cutting head 29a, and the outer end of the bore in which the cutting piston 35 is located may be sealed off by an appropriate wax mass 43. The joint between the cutting head 29a and the housing 23a is preferably sealed by a washer 44. The inner end of housing 23a is turned downwardly and closed by a disk 45, and a metering ring 25a is soldered or sweated into the bend of the housing 23a beyond the safety pin which comprises a flat-headed screw 46 threaded into an internally countersunk boss 46' of housing 23a and having a nut or small disk 47 pinned to its outer end.

Another embodiment of the invention, as illustrated schematically in Fig. 1, and in detail in Figs. 8 to 12, is similar in general structural arrangement to the embodiment shown in Figs. 2 to 4 but the cutting head 48 and main housing 49 are formed as an integral casting, and the ball pocket 50 is a separate casting with a flanged open end within and aluminum-soldered to a bell 51 at the inner end of the housing 49. A metering ring 52 is seated within the bell end 51 before casting 50, with a ball 53 therein, is secured to the housing 49. The safety pin comprises a wire 54 with a pull ring 55 at its outer end, the wire 54 being inserted through the central bore of a live rubber plug 56 seated in a boss 57 at the lower part of the casting 50 and retained in place by a cap 58 which is secured with the boss in any appropriate manner, as by a force fit, by staking the boss or by welding. A small shot or ball 59 is positioned at an intermediate point along the bore of the rubber plug 56, and this ball is forced laterally into the rubber plug by the pointed tip of the safety wire 54 when it is pressed through the plug 56 to extend across the outlet of the ball pocket 50. When the safety wire is withdrawn as the last step in the installation of the wire-dropping device upon a conductor, the ball 59 moves back into the bore of the plug 56 to seal the bore.

A collar or radial enlargement 60 with a longitudinal groove 61 at its upper surface is formed upon the tubular housing 49 to provide a seat for the conductor C to which the device is secured by fastening means F which may be a wrapping of tape or, as shown in Fig. 1, may be a C-clamp.

The cutting head 48 is of generally cylindrical form with a jaw or transverse slot 62 for receiving the conductor, the opposed walls of the jaw being grooved for insertion of a spring clip 63 which anchors the cutting head upon the conductor. The upper jaw or head 64 of the cutting head is relatively heavy to serve as an anvil for the cutting piston 65 which is seated in a transverse bore 66 of the cutting head. The piston 65 is hollow and a mass of explosive powder 67 is secured therein by a wad 68. The piston 65 is of non-circular cross-section, i. e. has a flat side with a transverse opening in which a primer 69 is fixed, and the bore 66 of the cutting head is of complementary cross-section to locate the primer 69 at the axis of the housing 49 when the combined cutting piston and cartridge element is secured within the cutting head by a breech block 70 which is threaded into the counterbored outer end of the cutting head bore 66.

Attention is directed to the fact that the bore 66 does not open into the jaw or transverse slot 62 by which the device is secured upon a conductor, i. e. the upper end of the bore 66 is closed by an integral diaphragm 71 of metal which seals the bore 66 but which is readily fractured by the cutting piston 65 when the powder charge is fired. Deterioration of the powder charge and primer is precluded by this sealing of the bore 66 since the other end of the housing is effectively sealed by the ball 59 when the safety pin 54 is withdrawn. A firing pin 72 is seated in an axial bore through the inner wall of the cutting head 48 and is anchored against inadvertent movement into pressure contact with the primer 69 by a washer 73 in which the outer end of the firing pin 72 has a tight sliding fit.

A further embodiment, as shown in Figs. 13 and 14, comprises a tubular housing 74 with an inturned outer end against which a cutting head 75 is clamped by the threaded bushing 76 in which the firing pin 77 is slidably mounted for limited axial movement as restricted by the transverse screw 78. The cutting head 75 has a threaded extension 79 which is slotted diametrically, parallel to the axis of the housing 74, to receive the conductor C upon which the device is secured by the anvil or bar 80 which is clamped upon the upper surface of the conductor by a nut 81 threaded upon the slotted extension 79. The cutting head 75 is oriented upon the housing 74 by a washer 82 with a rigidly attached pin 83 which passes through the flanged end of the housing 74 and into a mating recess in the cutting head, such recess being so located that the slotted extension 79 for receiving the conductor C is above the axis of housing 74 when the recess or pocket 74' for a ball 84 at the opposite end of the housing is below the axis. A metering ring 85 and threaded safety pin 86 are located outwardly of the pocket 84, and the inner end of the housing tube 74 is closed by a threaded plug 87. The inner end of the housing is secured to the conductor C by appropriate means such as the illustrated winding 88 of tape.

The firing pin bushing 76 is threaded into the inner enlarged end of a bore which extends through the cutting head 75 axially of the housing 74, the bushing retaining a cartridge 89 within the bore which is closed at its outer end by a threaded plug 90. A cutting piston 91 is seated in a transverse or vertically extending bore of the cutting head 75 and has a longitudinal slot for receiving the end of a pin 92 which is threaded into the cutting head 75 to locate the cutting edge of the piston 91 transversely of the conductor C. The cutting piston bore is sealed by a mass of wax or cement 93. In this form of the invention, the side wall of the cartridge 89 is blown out when the cartridge is fired, thereby to discharge pressure gases into the transverse bore to drive the cutting piston 91 through the conductor C.

Another embodiment of the invention in which many of the parts are identical with those of Figs. 13 and 14 is illustrated in Figs. 15 and 16, and such parts as are or may be of identical construction are identified by like numerals but will not be described in detail. In place of the one-piece cutting head 75 of Figs. 13 and 14, the assembly includes a block 75' which is secured to the tubular housing 74 and is axially bored to receive an explosive cartridge 89 and the bushing 76 in which a firing pin 77 is slidably supported, and a C-shaped block 94 for fitting upon the block 75'. Spring-pressed balls 95 are housed in vertical bores of the opposed arms of the C-shaped block 94 for engagement in recesses in the block 75' to secure the parts to each other.

The upper arm of the C-shaped block 94 has a recess 96 for receiving the conductor C upon which the device is supported.

As shown in Figs. 17 and 18, a cutting head 98 may have a bore extending axially of the housing 99 to which it is secured, and a bore inclined to that axis for receiving a cutting piston 100. The device is supported upon a conductor C, and with the piston at an oblique angle to the conductor, by a clamping band 101 and a stud 102 which is threaded into the upper part of the cutting head to retain the conductor within a transverse slot 103. A cartridge 104 is seated in the axial bore of the cutting head 98 and retained in place by bushing 105 in which a firing pin 106 is slidable; the outer end of the bore being closed by a plug 107. The outer end of the inclined bore is closed by a plug 108, and the cutting piston is sealed within its bore by wax 109.

Figure 20:
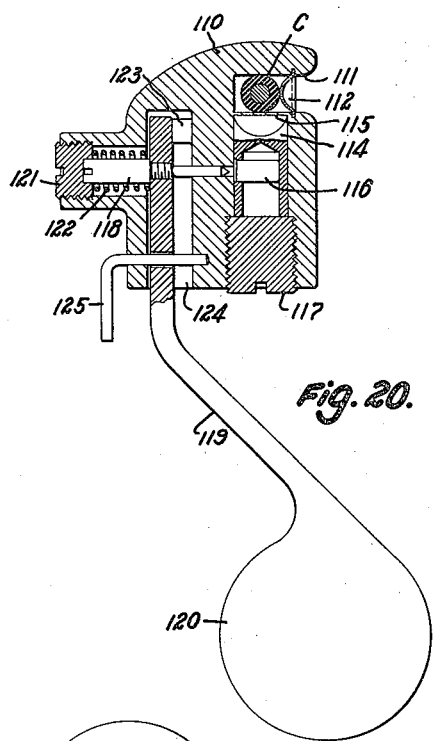
Fig. 20 is a transverse section on line 20—20 of Fig. 19.

Gravity-responsive devices other than a ball within a tube may be employed for firing the explosive cartridge upon a parting of the overhead conductor, for example weighted arms or pendulums such as illustrated in Figs. 19 and 20. The wire-dropping device comprises a casting 110 having a transverse recess 111 for receiving a conductor C which is retained within the recess by a spring clip 112. A C-clamp 113 rigidly secures the device upon the conductor, the clamp being at the supported end of the conductor span to prevent the dropping of the device with the severed wire and having the additional function of limiting the amount the stub end of the severed conductor can slip through the conductor support, thereby preventing the falling and severing of additional spans. A cutting piston 114 is located in a vertical bore beneath the conductor-receiving recess 111, and separated therefrom by a thin web 115. A blank cartridge 116 is mounted in a transverse port of the hollow piston 114, and a plug 117 is threaded into the outer end of the vertical bore to retain the piston 114 in place with the cartridge 116 in line with a firing pin 118. The firing pin is threaded through an arm 119 which extends upwardly from a weighted end 120 and is bent laterally to balance the device upon the conductor. The outer end of the firing pin 118 is pivotally supported in a recess of a plug 121 which provides a seat for a spring 122 which bears against the arm 119 to bias the firing pin 118 into engagement with the percussion cap of the cartridge 116. The firing pin 118 constitutes a journal for the weighted arm 119 and, when in normal position on a sound conductor C (as shown in Fig. 19) the upper end of the arm 119 engages a lug 123 on the inner wall of the recess 124 in which the arm 119 is pivotally supported, the lug being so dimensioned that the tip of the firing pin 118 is spaced from the cartridge 116. Upon the parting of the conductor C, the falling of the parted conductor results in a movement of the casting 110 with respect to the pendulum 119, 120 which brings the arm 119 into the relative position indicated in broken lines, i. e. the upper end of the arm 119 clears the lug 123 and the spring 122 then drives the firing pin 118 into the cap of cartridge 116 to explode the same, thereby driving the cutting piston 114 through the web 115 and the conductor C.

A safety pin 125 extends through alined openings in the casting 110 and the arm 119 to prevent an inadvertent firing of the cartridge during transport and installation. The pin 125 may be retained in place by a winding of tape, not shown, until the installation is completed.

Figure 21:
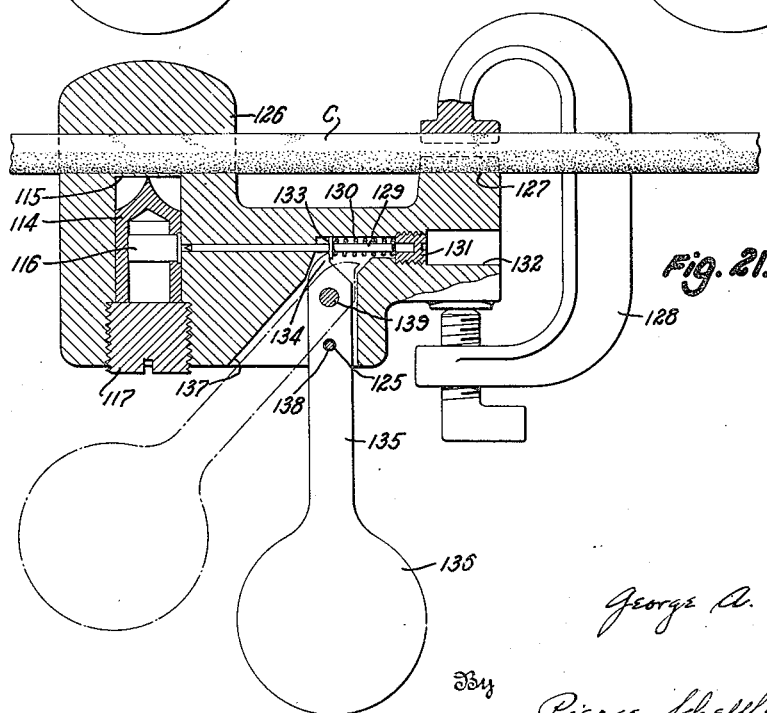
Fig. 21 is a longitudinal section through another weighted arm type of wire-severing device.

A further embodiment, as shown in Fig. 21, comprises a cutting head body or casting 126 which has a transverse recess at its outer end, similar to recess 111 of Fig. 19, for receiving a conductor C, and a seat 127 at its inner end upon which the conductor is rigidly secured by a C-clamp 128. A hollow cutting piston 114, cartridge 116 and end plug 117, which may be and preferably are identical with the correspondingly identified elements of Figs. 19 and 20, are located in a vertical bore which is spaced from the conductor-receiving recess by a frangible web 115. A firing pin 129, spring 130 and plug 131 are located in a bore 132 which extends transversely through the body 126 in alinement with the cap of the cartridge 116. The spring is seated between the plug 131 and the inner face of a radial flange 133 of the firing pin 129. The tip 134 of an arm 135 with a weighted lower end 136 bears against the outer face of the firing pin flange 133 when the wire-dropping device is installed on a sound conductor C, the weighted arm being located in a recess or groove 137 which extends upwardly from the lower face of the body 126 to open into the firing pin bore 132. The arm 135 has an opening 138, below the pivot pin 139 upon which the arm is mounted, for receiving a safety pin 125 such as illustrated in Fig. 20.

Upon the parting of the conductor C, the falling of the conductor rotates the body 126 counterclockwise to effect a relative movement of the weighted arm 135 into the position shown in broken line. During this relative movement, the tip 134 of arm 135 displaces the firing pin inwardly to compress the spring 130 and then moves clear of the firing pin flange 133 to permit spring 130 to drive the firing pin into the cap of the cartridge 116.

The several illustrated embodiments of the invention indicate that there is wide latitude in the shape and arrangement of the components of practical wire-dropping devices which operate in accordance with the principles of this invention, and that various modifications may be made without departing from the spirit and scope of the invention as set forth in the following claims.

I claim:

1. A wire-dropping device to be mounted on a tensioned conductor in predetermined normal position with respect to the axis of the conductor; said device comprising a cutter head having a conductor-receiving groove, removable gate means for closing the entrance to said groove, a supporting body for said cutting head, said cutter head having a bore with an axis intersecting said conductor-receiving groove, a cutting piston in said bore and having a knife at one end thereof, explosive means for driving said knife across said groove, and firing means operative to fire said explosive means upon movement of said device out of normal position by the parting of a conductor upon which the device may be mounted, thereby to drive said knife through a conductor on which the device may be mounted.

2. A wire-dropping device as recited in claim 1, in combination with safety means normally in operative position to prevent operation of said firing means during transport of the device and installation of the same on a conductor, said safety means being adjustable into inoperative position after installation of the device on a conductor.

3. A wire-dropping device as recited in claim 2, wherein said safety means is adjustable back to normal operative position after an initial adjustment into inoperative position after installation on a conductor, thereby to permit safe handling during work on the conductor or for the removal of the device from the conductor.

4. A wire-dropping device as recited in claim 1, wherein said supporting body is tubular with said cutting head at one end thereof; and said firing means includes a primer and a pin for firing said explosive means, and hammer means movable through said tubular body into engagement with said pin and normally positioned by gravity in a seat at the end of said tubular body opposite said cutting head when said device is in predetermined normal position.

5. A wire-dropping device as recited in claim 4, in combination with means precluding movement of hammer means out of its seat by vibration prior to movement of said device out of said normal position thereof.

6. A wire-dropping device as recited in claim 5, wherein said hammer means is a ball of substantially less diameter than the inside diameter of said tubular body, and said movement-precluding means comprises an obstruction reducing the clear passage through said tubular body to block movement of said ball hammer means out of its seat until the axis of said tubular body is approximately vertically arranged.

7. A wire-dropping device as recited in claim 6, wherein said movement-precluding means is a ring secured within said tubular body.

8. A wire-dropping device as recited in claim 1, wherein means seals the bore of said cutting head from the conductor-receiving groove.

9. A wire-dropping device as recited in claim 8, wherein said sealing means is a mass of wax covering the end of the cutting knife adjacent the conductor-receiving groove.

10. A wire-dropping device as recited in claim 8, wherein said sealing means is a frangible diaphragm integral with the cutting head.

11. A wire-dropping device as recited in claim 1, wherein said cutting piston is hollow and said explosive means is within said hollow piston.

12. A wire-dropping device as recited in claim 1, wherein said explosive means is a blank cartridge.

13. A wire-dropping device as recited in claim 1, wherein said explosive means is a blank cartridge, and said cutting piston is hollow and has a transverse bore in which said cartridge is positioned.

14. A wire-dropping device as recited in claim 1, wherein said firing means includes a weighted arm pivotally mounted on said supporting body, a firing pin, spring means biased to move said pin to fire said explosive means, and means including said weighted arm preventing movement of said pin to fire said explosive charge so long as said device remains in said predetermined normal position.

15. A wire-dropping device as recited in claim 14, wherein said firing pin provides the pivotal mounting for said weighted arm, and said last-mentioned means includes a lug engaged by said weighted arm so long as said device remains in normal position.

16. A wire-dropping device as recited in claim 14, wherein said last-mentioned means includes a flange on said firing pin and normally engaged by the tip of said weighted arm to prevent movement of said firing pin to fire said explosive means, said flange being moved to clear said weighted arm tip upon tilting of the cutter head towards said weighted arm upon the parting of a conductor upon which the device may be mounted.

GEORGE A. MATTHEWS.

REFERENCES CITED

The following references are of record in the file of this patent:

UNITED STATES PATENTS

| Number | Name | Date |
|---|---|---|
| 655,219 | Frischmuth | Aug. 7, 1900 |
| 1,005,179 | Elliott | Oct. 10, 1911 |
| 1,397,911 | Tossizza | Nov. 22, 1921 |
| 1,919,663 | Mathiew | July 25, 1933 |
| 2,149,070 | Poinan | Feb. 28, 1939 |

FOREIGN PATENTS

| Number | Country | Date |
|---|---|---|
| 335,389 | Great Britain | Sept. 25, 1930 |
| 738,081 | France | June 2, 1932 |